United States Patent [19]

Fisher et al.

[11] 4,189,207
[45] Feb. 19, 1980

[54] DEEP FOCUS FIBER OPTIC LENS

[76] Inventors: Charles B. Fisher, 2850 Hill Park Rd., Montreal, Quebec, Canada, H3H 1T1; Sidney T. Fisher, 53 Morrison Ave., Mt. Royal, Montreal, Quebec, Canada, H3R 1K3

[21] Appl. No.: 28,689

[22] Filed: Apr. 10, 1979

[51] Int. Cl.² ............................................. G02B 5/17
[52] U.S. Cl. .............................. 350/96.25; 350/175 R; 350/276 R
[58] Field of Search ............... 350/96.24, 96.25, 96.26, 350/96.27, 96.28, 175 R, 175 LD, 276 R, 276 SL, 319

[56] References Cited

U.S. PATENT DOCUMENTS

| | | | |
|---|---|---|---|
| 1,959,915 | 5/1934 | Guthrie | 350/175 R X |
| 2,653,516 | 9/1953 | Johnson | 350/276 R |
| 3,188,188 | 6/1965 | Norton | 350/96.24 X |
| 3,469,026 | 9/1969 | Winik et al. | 350/96.24 X |
| 3,832,029 | 8/1974 | Bryngdahl | 350/96.28 |
| 3,913,872 | 10/1975 | Weber | 350/96.28 X |
| 4,070,763 | 1/1978 | Carts, Jr. | 350/96.24 X |
| 4,087,159 | 5/1978 | Ulrich | 350/96.27 X |
| 4,157,213 | 6/1979 | Phillips | 350/96.27 X |

FOREIGN PATENT DOCUMENTS 1906360 10/1969 Fed. Rep. of Germany ........ 350/96.27
2147047 3/1973 Fed. Rep. of Germany ........ 350/96.25

OTHER PUBLICATIONS

Longhurst, *Geometrical and Physical Optics*, London, 1967, pp. 338–339.
Meyer-Arendt, *Introduction to Classical and Modern Optics*, Prentice-Hall, 1972, pp. 74–77.

*Primary Examiner*—John K. Corbin
*Assistant Examiner*—John D. Lee

[57] ABSTRACT

A lens comprising a plurality of identical straight optical fibers arranged in a bundle with at least a portion of each fiber treated to suppress internal reflections, so that each fiber transmits only rays which enter the end of the fiber substantially parallel to its axis at that point, the angle between adjacent fibers of the bundle of optical fibers being adjustable to provide a lens for a range of solid angles, with a field of any shape and an image adjustable in size which may be altered in location and plane, by extending the optical fibers by flexible sections with internal reflections permitting transmission of rays on curved paths.

2 Claims, 5 Drawing Figures

U.S. Patent     Feb. 19, 1980     4,189,207
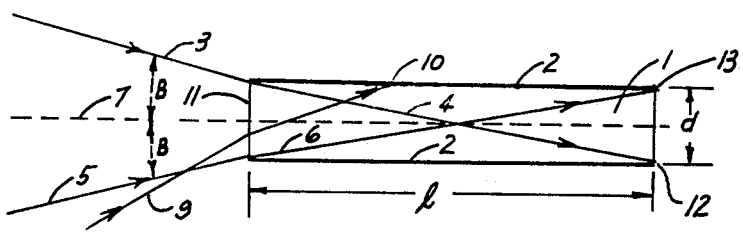
FIG. 1
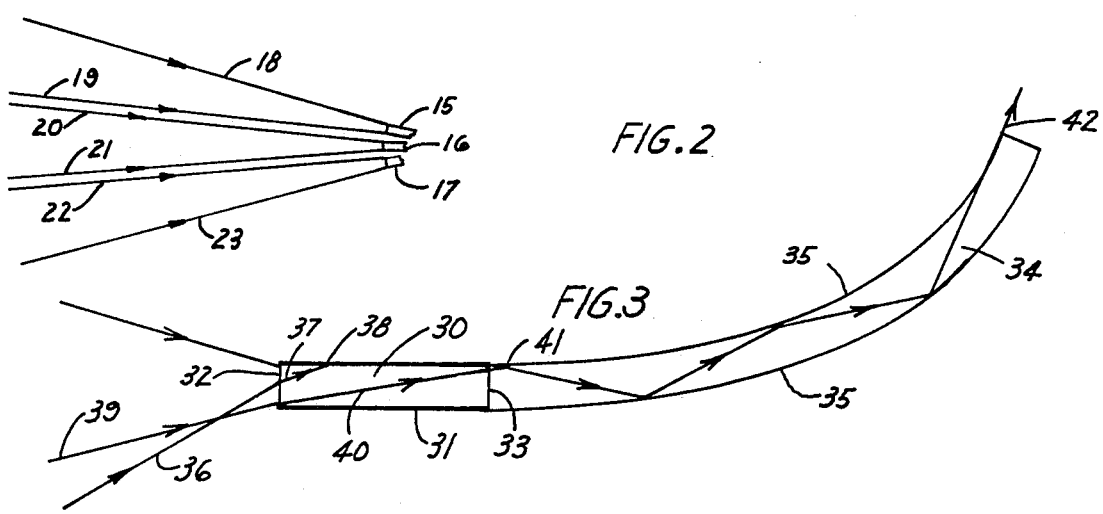
FIG. 2
FIG. 3
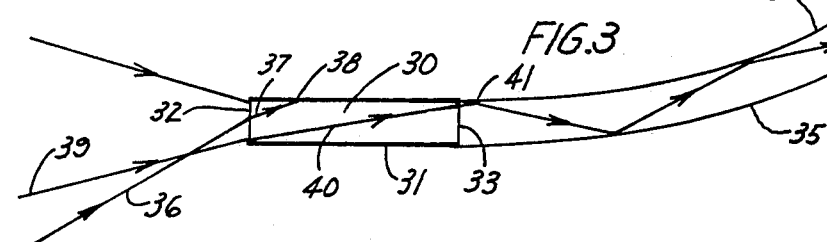
FIG. 4
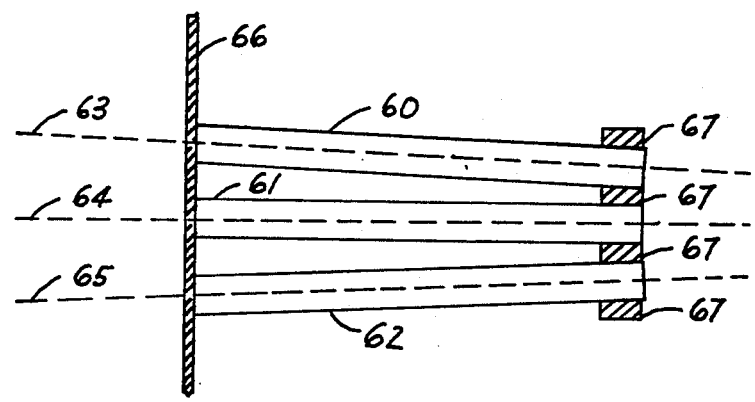
FIG. 5

DEEP FOCUS FIBER OPTIC LENS

BACKGROUND OF THE INVENTION

The use of optical fibers to transmit radiation and bundles of optical fibers to transmit images is well known. We do not know of any prior patent art, publication or apparatus which is relevant to our invention of a lens comprising a bundle of optical fibers at specified angles, with means for adjusting the angles, and with a portion of each fiber treated to suppress internal reflections.

BRIEF DESCRIPTION AND OBJECTS OF THE INVENTION

This invention discloses a lens comprising a bundle of straight cylindrical optical fibers arranged uniformly in a bundle. It is required that at least a portion of the cylindrical surface of these fibers is coated or treated to suppress internal reflections. A second requirement is that each fiber transmits rays lying within an angle from its axis determined by its refractive index and ratio of length to diameter, and this angle is equal to the angle between axes of adjacent fibers in the bundle. The novel features of the invention are the means that are disclosed to alter the angle between the axes of adjacent fibers.

The objects of this invention are to provide a lens which has a very deep focus, which has a variable angle of view, up to a solid angle of 360°, which has a speed useful in photography, and which may be circular, rectangular or other desired shape.

LIST OF DRAWINGS

The following drawings facilitate explanation of this invention.

FIG. 1 shows a sectional view of a straight cylindrical optical fiber as used in this invention with a coated or treated surface, with transmitted optical rays.

FIG. 2 shows a view of three adjacent optical fibers as used in this invention, with transmitted rays.

FIG. 3 shows a sectional view of an extended optical fiber as used in this invention.

FIG. 4 shows a lens comprising a bundle of optical fibers embedded in a flexible elastic mass, with rotatable rings to vary the relative directions of the axes of the optical fibers in a uniform manner, as used in this invention.

FIG. 5 shows a lens comprising a bundle of optical fibers with an attached flexible elastic sheet which can be stretched to vary the directions of the optical fibers in a uniform manner, as used in this invention.

DETAILED DESCRIPTION OF THE INVENTION

FIG. 1 shows a sectional view of a straight cylindrical optical fiber as used in this invention, with a coated or treated surface, with transmitted optical rays. Fiber 1 has length l, diameter d, central axis 7 and a non-reflecting surface or coating 2. Fiber 1 is shown in section but is not cross-hatched, for clarity in showing the optical rays. Fiber 1 may be any material which adequately transmits the required wavelength of radiation. The surrounding medium may be air, water or other transparent substance. The surface 2 may be a radiation-absorbing coating, or have a surface treatment such as sandblasting or etching, so that a ray such as 9 which does not lie in the permitted angle between rays 3 and 5, strikes coating 2 at point 10 and is not reflected. Ray 3 is at one extreme of the permitted range. It strikes face 11 of fiber 1, is refracted in direction to ray 4, and just escapes surface 2 at point 12. Similarly ray 5 at the other extreme strikes face 11 of fiber 1, is refracted to ray 6, and just escapes surface 2 at point 13. Fiber diameter d and length l are chosen so that angle B between rays 3 and 5 and the fiber axis 7 is an adequate value to resolve the scene being viewed by the lens. The angle between rays 3 and 5 for a glass fiber in air is about 3 times the angle which rays 4 and 6 make with axis 7, or about $3 \sin^{-1} d/l$. Thus if adjacent fibers have this angle between their axes the lens comprising the fibers substantially completely views every point of the field. The diameter d of each fiber must be substantially greater than a wavelength of the radiation to permit transmission as described above.

FIG. 2 shows a view of three adjacent optical fibers as used in a lens according to this invention, with a fixed angle of view. These fibers designated 15, 16 and 17 respectively are identical to the fiber of FIG. 1, with extreme entering rays 18 and 19, 20 and 21, and 22 and 23, respectively, the angles between the extreme entering rays of each fiber being equal, and the same as the angles between the axes of adjacent fibers. Thus the lens views substantially the entire field, omitting only those small areas between rays 19 and 20, and between rays 21 and 22.

FIG. 3 shows a sectional view of an extended optical fiber as used in this invention. For sake of clarity the fiber is not cross-hatched. A straight cylindrical section 30 with a non-reflecting coating or surface 31 extends from entrance face 32 to exit face 33, and is substantially identical to the fiber of FIG. 1. In FIG. 3 the fiber is continued in an extended portion 34, which may be curved in 3 dimensions. Portion 34 has a reflecting coating 35 which may be a metal or a transparent medium with an index of refraction different from the fiber.

A ray 36, outside the angle of acceptance of portion 30, is refracted as ray 37, strikes coating or surface 31 at point 38 and is suppressed. A ray 39, inside the angle of acceptance of portion 30 is refracted as ray 40, strikes reflecting coating 35 at point 41, beyond surface 31 which suppresses reflections, is repeatedly reflected from surface 35 of the fiber and emerges as ray 42. The permissible minimum radius of curvature of portion 34 depends on its material, its diameter and the reflecting surface, but may be of the order of three to 10 fiber diameters.

FIG. 4 shows a sectional view of a lens comprising a bundle of optical fibers, 45, 46 and 47, with axes 48, 49 and 50 respectively, embedded in flexible elastic masses 53 and 54. Mass 53 encloses the fibers at one end and is attached to rotatable ring 51. Mass 54 encloses the fibers at the other end and is attached to ring 52. For the sake of clarity only 3 fibers are shown. Each fiber is similar to the fibers of FIG. 1 or of FIG. 3, and accepts only rays within a small angle of its axis. When ring 51 is rotated a fraction of a turn relative to ring 52, fibers 45 and 47 are skewed to new positions not in the same plane as fiber 46, and their axes are shifted so that they strike the field at new locations, thus changing the viewing angle of the lens. Fiber 46, which is the central fiber of the lens, remains in a fixed location. Elastic masses 53 and 54 are sufficiently flexible so that fibers 45, 46 and 47 remain straight.

FIG. 5 shows a sectional view of a lens consisting of only 3 fibers 60, 61 and 62 with axes 63, 64 and 65 in the same plane, for reasons of simplicity. These fibers are identical with the fibers of FIG. 1 or FIG. 3 and cover a definite field of view, with rays from any point in the field entering only one fiber, as in FIG. 2. A flexible elastic transparent sheet 66 is attached to one end of the fibers, and the other end of the fibers is embedded in a flexible mass 67. In order to change the angle of view of the lens comprising the fibers, elastic sheet 66 is stretched uniformly with all stretching forces in its plane and passing through axis 64, so that fibers 60, 61 and 62 remain in the same plane, but the angles increase between axes 63 and 64, and between 64 and 65, while remaining equal. Thus the field of view of the lens is increased. Mass 67 is sufficiently flexible that fibers 60, 61 and 62 are not bent a material amount when sheet 66 is stretched to give the desired field of view.

The fibers of FIGS. 1, 2, 3, 4 and 5 may be of glass or other suitable material, they may be round, hexagonal or other suitable shape in cross-section. In FIG. 4 the lens has been assumed as circular, but in FIG. 5 the lens may be of any shape, with the direction of all forces stretching the elastic sheet passing through axis 64 and lying in the plane of the elastic sheet.

We claim:

1. An optical lens comprising a bundle of straight cylindrical optical fibers, substantially uniformly distributed, with at least a portion of their cylindrical surfaces coated or treated to prevent internal reflection of optical rays, each of said fibers extending beyond said straight portion, said extended portion coated to provide substantially complete reflection of internal rays striking its walls, and means for changing the angle between adjacent optical fibers in said bundle in a uniform manner, which comprises a flexible elastic mass which embeds said straight portions of said fibers, attachment means at each end of said straight portions of said bundle of fibers, and means for rotating said attachment means at one end of said bundle relative to said attachment means at the other end of said bundle, which causes the fibers of said bundle to alter their relative angles while remaining substantially straight.

2. An optical lens comprising a bundle of straight cylindrical optical fibers, substantially uniformly distributed, with at least a portion of their cylindrical surfaces coated or treated to prevent internal reflection of optical rays, each of said fibers extending beyond said straight portion, said extended portion coated to provide substantially complete reflection of internal rays striking its walls, and means for changing the angle between adjacent optical fibers in said bundle in a uniform manner, which comprises an elastic transparent sheet which is attached to all of said fibers at one end of said bundle, the fibers being embedded at the other end of said bundle in a flexible mass, said fibers changing their relative angles and remaining substantially straight when said elastic sheet is stretched.

* * * * *